United States Patent [19]

Ushiro et al.

[11] Patent Number: 4,921,343
[45] Date of Patent: May 1, 1990

[54] OVERHEAD PROJECTOR

[75] Inventors: Seimei Ushiro, Tokyo; Bunsuke Emura, Musashino, both of Japan

[73] Assignee: Fuji Photo Film Co., Ltd., Japan

[21] Appl. No.: 245,983

[22] Filed: Sep. 14, 1988

Related U.S. Application Data

[63] Continuation of Ser. No. 902,168, Aug. 29, 1986, abandoned.

[30] Foreign Application Priority Data

Sep. 5, 1985 [JP] Japan .............................. 60-135915[U]
Oct. 24, 1985 [JP] Japan .................................. 60-238460
Aug. 13, 1986 [JP] Japan ............................. 61-124380[U]

[51] Int. Cl.$^5$ .......................................... G03B 21/132
[52] U.S. Cl. ................................. 353/66; 353/DIG. 3; 353/98; 353/119; 353/101
[58] Field of Search ........................ 353/65, 66, 67, 22, 353/23, 24, 119, 120, 122, 71, 96, 98, 99, 100, 101, DIG. 3, DIG. 5, DIG. 6

[56] References Cited

U.S. PATENT DOCUMENTS

| 2,564,057 | 8/1951 | Fitzgerald | 353/DIG. 3 |
| 2,669,156 | 2/1954 | Fitzgerald | 353/101 |
| 3,482,911 | 12/1969 | Noble | 353/DIG. 5 |
| 3,486,817 | 12/1969 | Hubner | 353/DIG. 4 |
| 3,512,883 | 5/1970 | Noble | 353/DIG. 5 |
| 3,711,194 | 1/1973 | Wilson | 353/DIG. 3 |
| 3,762,809 | 10/1973 | Kato et al. | 353/DIG. 5 |
| 4,002,408 | 1/1977 | Amma | 353/DIG. 3 |
| 4,353,627 | 10/1982 | Maemori | 353/DIG. 3 |
| 4,449,800 | 5/1984 | De Longis et al. | 353/DIG. 3 |
| 4,728,184 | 3/1988 | Kyhl | 353/122 |

FOREIGN PATENT DOCUMENTS

| 18135 | 2/1978 | Japan . | |
| 0201034 | 11/1984 | Japan | 353/100 |

Primary Examiner—William A. Cuchlinski, Jr.
Assistant Examiner—Patrick R. Scanlon
Attorney, Agent, or Firm—Pasquale A. Razzano

[57] ABSTRACT

A variable power reflectory type overhead projector for forming a projected luminous beam by lighting a reflecting mirror from the projecting lens side. A transparent film-to-be-projected support is provided between a regular position of the film to be projected and the projecting lens, and an auxiliary lens is included for focusing the projecting lens on the support.

5 Claims, 7 Drawing Sheets 4,921,343

OVERHEAD PROJECTOR

This application is a continuation of application Ser. No. 902,168, filed Aug. 29, 1986, and now abandoned.

BACKGROUND OF THE INVENTION

1. Field of the invention

The present invention relates to a reflectory type overhead projector which has a light source and a projecting lens provided on the same side with respect to a reflecting plate and is capable of changing the magnification of projection.

2. Description of the Prior Art

It is publicly known that there is a reflection system overhead projector which has a light source and a projecting lens provided on the same side with respect to a reflecting plate and projects a subject mounted in close contact with the reflecting plate. As overhead projectors project subjects of varied sizes, variable magnification of projection is desirable. In case of reflection system overhead projectors, however, placing a subject apart from the reflecting plate means there are two subjects on the optical path of projection and it inevitably causes the problem of producing a blurred image of the subject overlapping the proper image of the subject. Therefore, efforts are made to bring the subjects as closely as possible to the reflecting plate with the belief that a variable power overhead projector of the reflection system is hard to realize when a practically tolerable focal depth should be maintained.

OBJECT OF THE INVENTION

It is therefore an object of the invention to provide an overhead projector capable of changing the magnification of projection by a simple structure.

Another object of the invention is to provide an overhead projector having a variable power projecting device which is built independently from an overhead projector proper, is foldable to be compact in size and does not hinder the portability of portable overhead projectors.

SUMMARY OF THE INVENTION

According to the present invention, the above and other objects can be accomplished by an overhead projector which forms a projected luminous beam by lighting a reflecting mirror from the projecting lens side, characterized in that a transparent film-to-be-projected support is provided between a regular position of the film to be projected and the projecting lens, and an auxiliary lens is included for focusing the projecting lens on said support.

In a preforred aspect of the present invention, an overhead projector includes the props for supporting a projection unit comprising a light source at their upper ends, a projecting lens, and a mirror for changing the direction of projection, all arranged on an optical path of projection; a lid divided into a pair of half-lid members, one of the half-lid members being pivotally and integratedly supported with the props at one side of a base; and hanging means provided at one of the film supports for holding the film support by hanging it on one of the half-lid members.

According to another aspect of the present invention, the film support is fitted receivably to a head support member, and said support is received in the head support member when a film to be projected placed at the regular position is projected, and the film support is protruded from the head support member for projection using the auxiliary lens.

In this instance, the film may then be provided with filmweights on the tops of the unhinged sides. The support member of the projecting lens may have a thin hole for passing films, the thin hole being adjacent to the hinged portion of the film support, and the reflecting mirror may be an eccentric Fresnel reflecting mirror.

According to the present invention, the above and other objects can be accomplished by an overhead projector which forms a projected luminous beam by lighting a reflecting mirror from the projecting lens side, characterized in that it has a variable power projecting device which is independent from a projector proper, and comprises a first film-to-be-projected stage base having a transparent portion, legs to support the first stage base above a second film stage base of the projector proper, and a convergent lens which is supported by support members fitted to the first film stage base and is positioned between the first film stage base and the projecting unit of the projector proper.

The above and other objects and features of the present invention will become apparent from the following description of preferred embodiments with respect to accompanying drawings.

PREFERRED EMBODIMENTS

Figure 1:
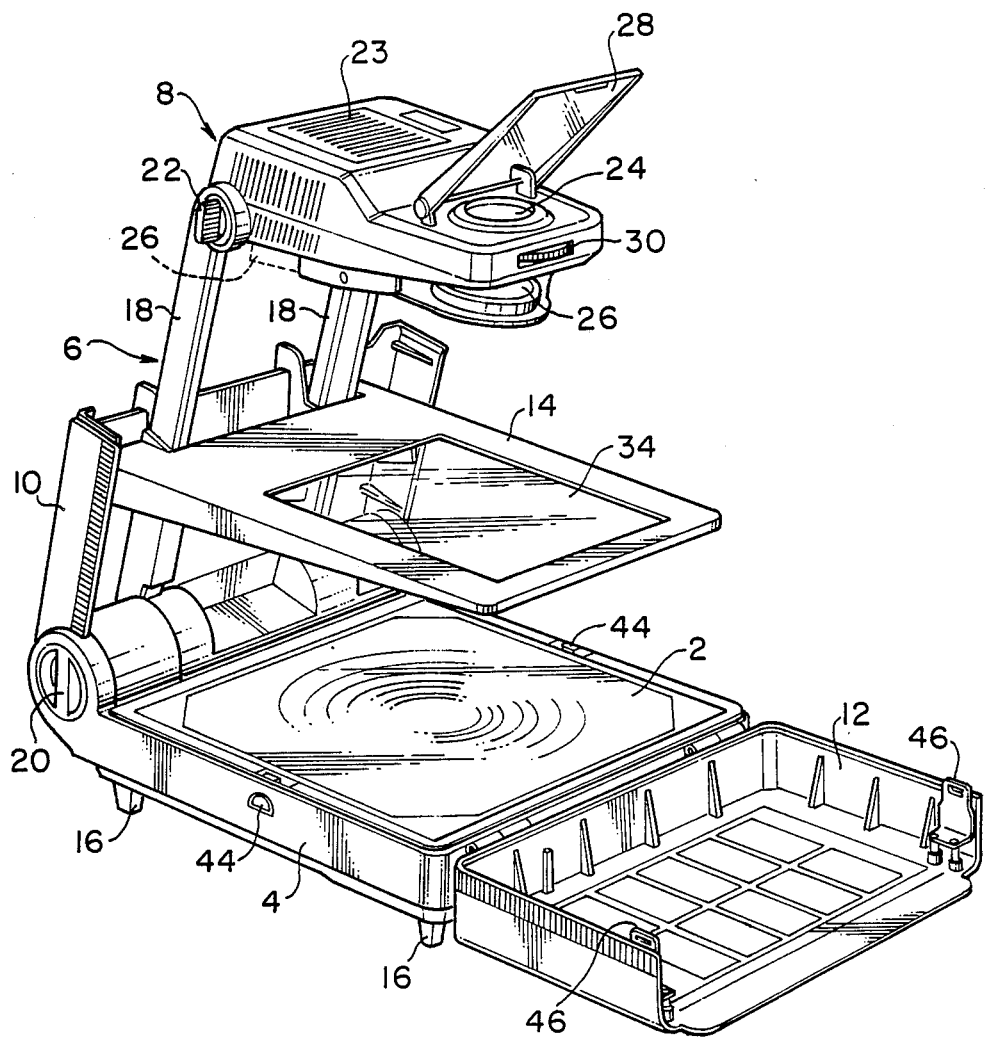
FIG. 1 is a perspective illustration showing an overhead projector of the first embodiment according to the present invention being used for magnifying projection.
Figure 2:
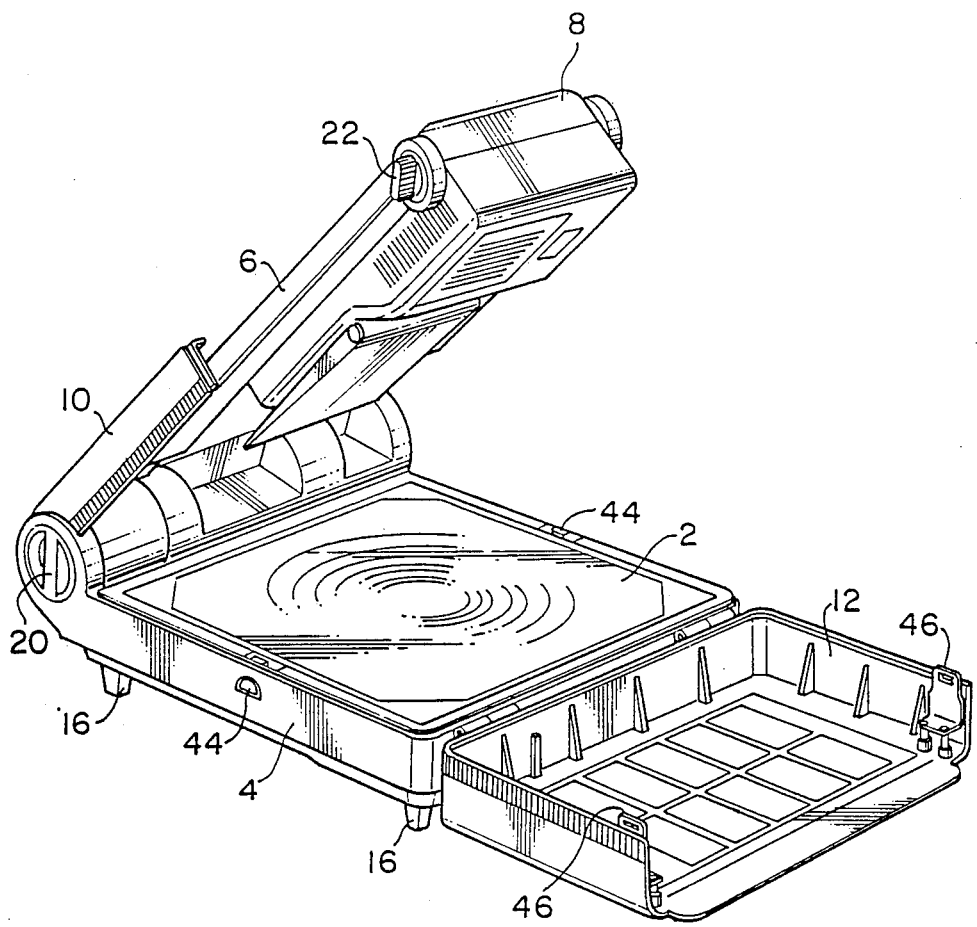
FIG. 2 is a perspective illustration showing the initial stage of folding the overhead projector.

The present invention is described further by way of three embodiments, referring to accompanying drawings. The first embodiment reflectory type overhead projector is shown in FIGS. 1-5. FIG. 1 is a perspective illustration showing the reflection system overhead projector in use, and FIG. 2 is a perspective illustration showing the overhead projector in the initial stage of being folded for carrying. The reflectory type system overhead projector has a base 4 fitted with a reflecting plate 2, which is a mirror Fresnel plate, on the upper surface thereof, props, i.e., a head arm 6 pivotally supported by an end portion of the base 4, a head housing 8 pivotally supported by the upper end of the head arm 6 to receive a projecting unit, a rear half cover 10 which is one of half-lid members attached adjacently to the pivotally supported portion of the head arm 6, and a front half cover 12 which is another half-lid member pivotally supported by an end portion of the base 4 opposite to the pivotal support portion of the head arm 6. Further, the overhead projector has a film-to-be-projected support 14 to be detachably fitted to the head arm 6 and the rear half cover 10.

Figure 5:
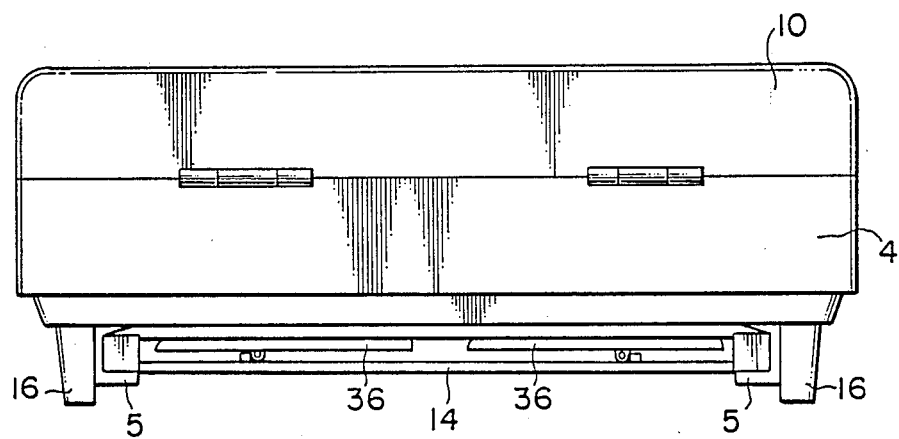
FIG. 5 is a rear view of the reflectory type overhead projector in the portable condition.

As shown in FIGS. 1 and 5, the base 4 has, on its lower surface, rail members 5 to receive the film support 14 slidably in a direction to cross at a right angle the direction of the pivotal support of the head arm 6, and leg members 16 fitted at the four corners of the lower surface. The head arm 6 comprises two arm members 18 capable of swinging between a horizontal direction close to the reflecting plate and an upward direction in which the arm lifts the head housing 8. A swung position is fixed by means of an arm-folding knob 22 provided in the pivotal support portion.

Figure 3:
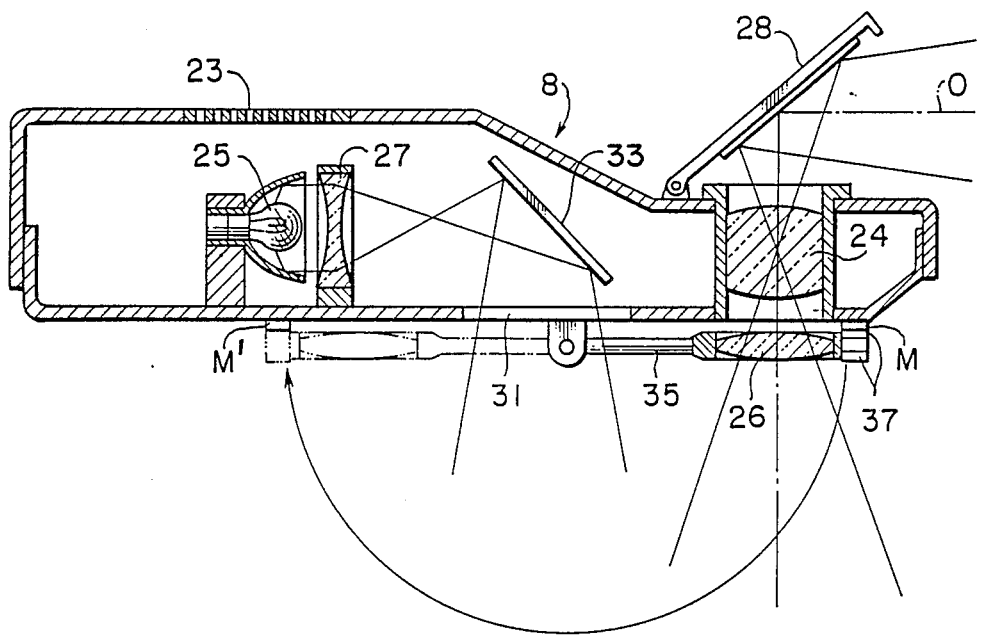
FIG. 3 is a sectional view of a head housing of the overhead projector.

The head housing 8 is capable of swinging with respect to the head arm 6 between a horizontal direction in which it is placed when the head arm 6 is in an upward direction (FIG. 1) and a folding direction parallel to the head arm 6 (FIG. 2), and the swung position is fixed by means of a head-folding knob 22 provided in the pivotal support portion. As shown in FIG. 3, in the head housing 8, there are provided a lighting lamp 25 and a condensor lens 27 being located below a heat radiating window 23, and a fixed mirror 33 being located above a lighting aperture 31.

Further, in the head housing 8, a projecting lens 24 is provided on a side opposite to the pivotal support portion. On the lower surface of the head housing, an auxiliary lens, namely, a convergent lens 26 is pivotally supported, maintaining a predetermined frictional resistance. A projecting mirror 28 is pivotally supported on the upper surface, maintaining a predetermined frictional resistance. The convergent lens 26, pivotally supported through a frame member 35 on both sides of the lighting aperture 31, swings between an inserted position on an optical path 0 of projection shown by solid lines and a retreated position shown by phantom lines in FIG. 3.

An end portion of the frame member 35 is fitted with iron pieces 37, and magnets M, M' are fitted to the lower surface of the head housing 8 at points of contact with the iron pieces 37 when the frame member 35 is in the inserted position and in the retreated position described above. As shown in FIG. 1, on the front surface of the head housing 8, a focusing dial 30 is provided for focusing the projecting lens 24 by sliding it in a direction of the optic axis.

Figure 4:
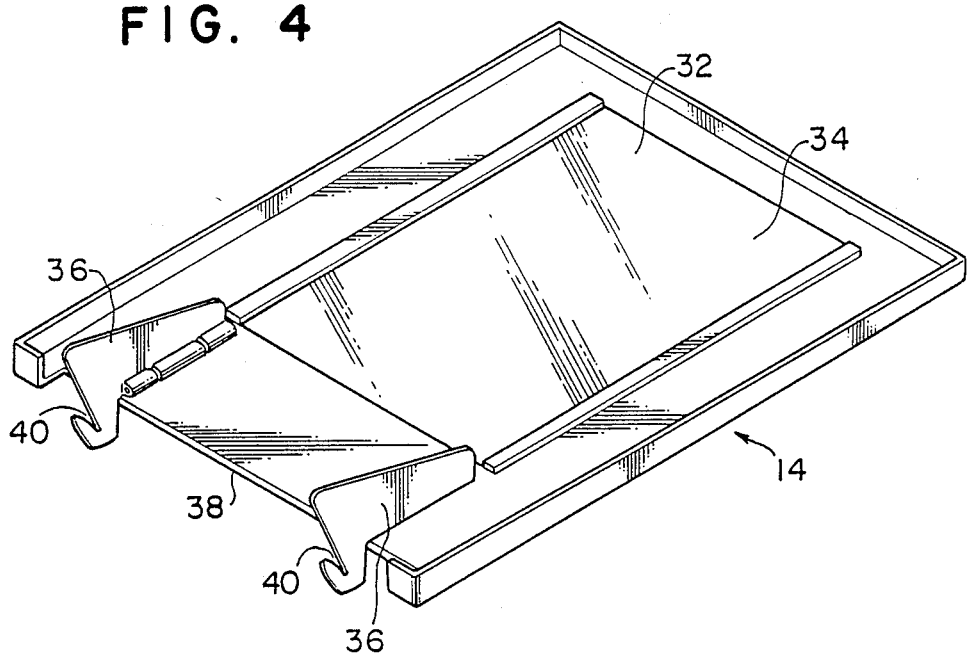
FIG. 4 is a perspective illustration of a magnifying stage viewed from the bottom surface side.

As seen in the perspective illustration of FIG. 4 showing the bottom surface side, the film support 14 is formed with an opening 32 at a slightly deviated central position, and a transparent glass 34 is mounted there. A cut 38 is provided at an end portion of the opening 32 opposite to the decentered direction and a pair of hanger members 36 are pivotally supported near both ends of the cut 38. The width of the cut 38 is substantially equal to the outer size of the arm members 18, and the hanger members 36 are formed with thin spaces 40 to come into engagement with a front end portion of the rear half cover 10.

The film support 14 structured as described above is received onto the lower side of the base 4 by the rail members 5 when the hanger members 36 are forced down as shown in FIG. 5. When the hanger members 36 are raised and hung on the rear half cover 10 as shown in FIG. 1, the support is ready for use.

The front end of the rear half cover 10 in the closed position is structured to be covered by the rear end of the front half cover 12 in the closed position. As shown in FIG. 1, at the rear ends of the side walls of the front half cover 12 in the closed position, lock members 46 to come into engagement with lock members 44 of the base 4 are provided.

The overhead projector being structured as described above, for ordinary projection, the head arm 6 is lifted, and the head housing 8 is positioned horizontally as shown in FIG. 1 and is fixed in this condition by means of the arm-folding knob 20 and the head-folding knob 22. Further, as shown by imaginary lines in FIG. 3, the convergent lens 26 is set in the retreated position and is held by the iron piece 37 and the magnet M', and the projecting mirror 28 is lifted into an inclined condition. The magnifying stage 14 remains under the base 4. The lighting lamp 25 is lit, the subject is mounted on the reflecting plate 2, and the focusing dial 30 is adjusted to form an image of the subject on a predetermined screen (not shown in the drawings).

For magnifying projection, as shown by solid lines in FIG. 3, the convergent lens 26 is placed in the inserted position and is held there by the iron piece 37 and the magnet M. The magnifying stage 14 is taken out from under the base 4, and the hanger members 36 are made to stand upright with respect to the magnifying stage 14 and are attached to the head arm 6 and the rear half cover 10. Then, the subject is mounted on the transparent glass 34.

For folding the overhead projector to carry about, as shown in FIG. 2, the magnifying stage 14 is detached from the head arm 6 and the rear half cover 10. The hanger members 36 are brought down on the magnifying stage 14, and the magnifying stage is interlocked with the rail members (not shown in the drawing), and put away under the base 4. Then, the projecting mirror 28 is forced down on the head housing 8, and the head-folding knob 22 and the arm-folding knob 20 are temporarily loosened to fold the head housing 8 and the head arm 6. Subsequently, the front half cover 12 is closed and locked by bringing the lock member 44 into engagement with the lock member 46.

Figure 6:
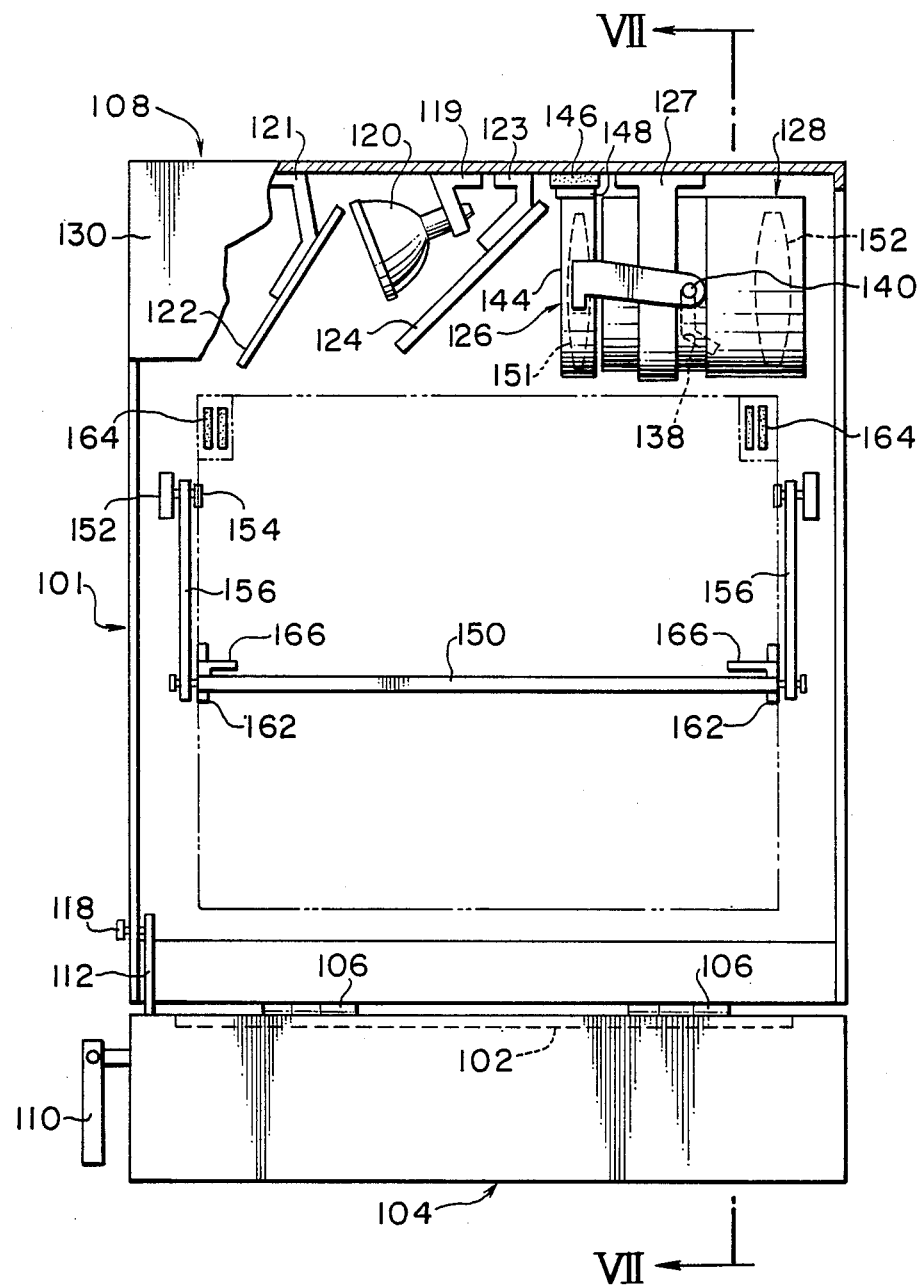
FIG. 6 is a front view of an overhead projector of the second embodiment according to the present invention.
Figure 7:
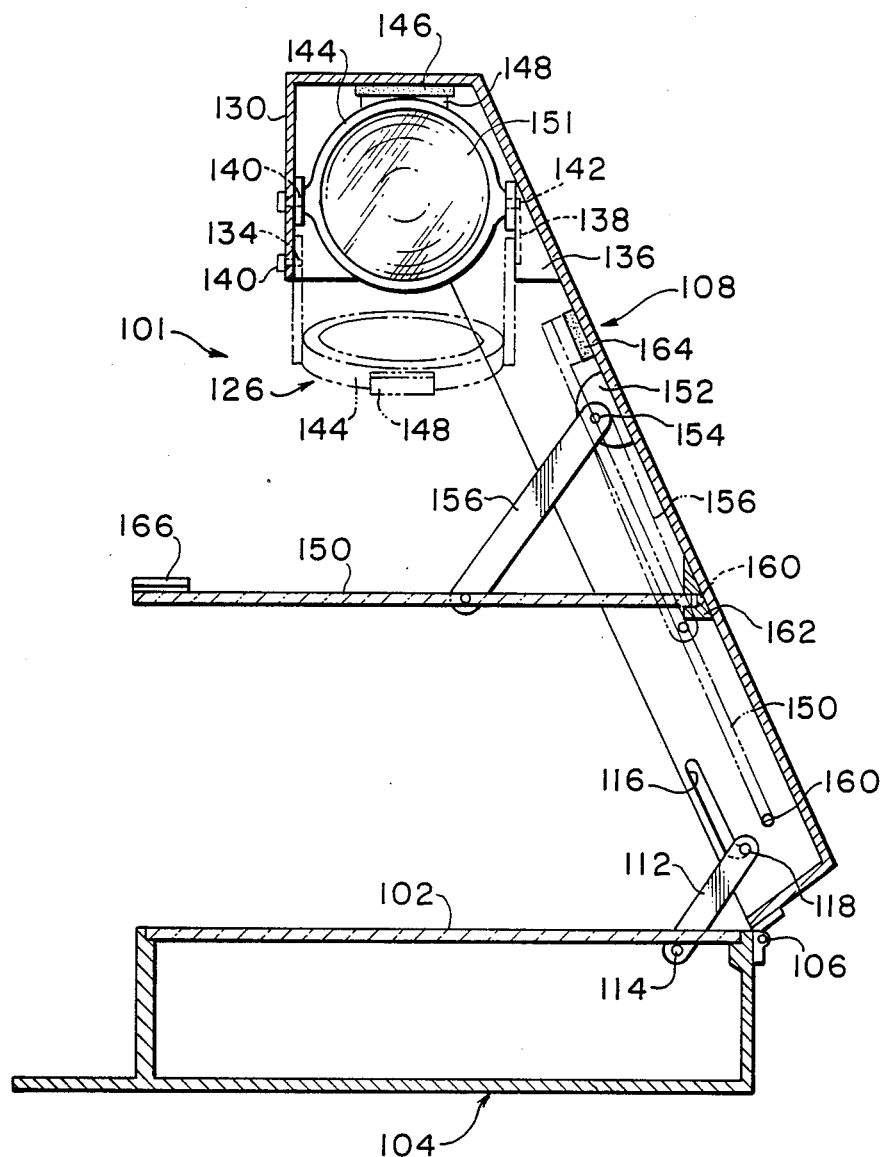
FIG. 7 is a sectional view taken along the line VII—VII of FIG. 6.

The second embodiment overhead projector is shown in FIGS. 6 and 7. A reflectory type overhead projector 101 has a body 104 provided with a decentering Fresnel reflecting mirror 102 on the upper surface thereof, and a lid 108 hinged to the body 104 by means of hinges 106. A handle 110 is attached to a side wall of the body 104 for carrying the projector. For keeping the lid 108 in the opened condition, a stay 112 is pivotally supported by a pin 114 at a position close to the hinge 106 on the upper surface. An upper end portion of the stay 112 is provided with a pin 118 which is slidably engaged within a J-shaped groove 116 provided on a side wall of the lid 108.

A light source lamp 120 facing obliquely downward is attached by a fitting member 119 to an upper portion of the lid 108, and a lighting mirror 122 is attached by a fitting member 121 for directing light projected from the light source lamp 120 to the Fresnel reflecting mirror 102. Further, in the upper portion of the lid 108, a projecting mirror 124 is provided obliquely through a fitting member 123 at a position above the center of the Fresnel reflecting mirror 102 when the lid 108 is placed in the opened condition, and a convergent lens unit 126 and a projecting lens unit 128 supported by a lens supporter 127 are provided on the optic axis of the projection reflected by the projecting mirror 124.

The convergent lens unit 126 is supported by a lens supporter 144 having sliding pins 140, 142 which are engaged within a cam hole 134 provided in a cover member 130 of the lid 108 and a cam groove 138 of a cam groove member 136 fixedly secured to the lid 108. The lens supporter 144 has a metal piece 148 in position to be attracted to a magnet 146 attached to the lower surface of an upper wall of the lid 108. For magnifying projection, the sliding pins 140, 142 are positioned in upper end portions of the cam hole 134 and the cam groove 138, and then, the metal piece 148 is attracted to the magnet 146 to set the lens supporter 144 and a convergent lens 151 at a predetermined position with respect to a projecting lens 152.

For ordinary projection, the magnet 146 and the metal piece 148 are separated from each other. Then, the sliding pins 140, 142 move to lower end portions in the cam hole 134 and the cam groove 138 due to gravity and the lens supporter 144 hangs down as shown by phantom lines in FIG. 7. Consequently, the projected light reflected by the projecting mirror 124 passes through only the projecting lens 152 to form a predetermined image on a screen (not shown in the drawings).

A film-to-be-projected support 150 for magnifying projection is made of a transparent material and its mid portion is pivotally supported by stays 156. One end of each of the stays is pivotally supported through a fitting member 152 and a pin 154 fitted to the fitting member by the lid 108 as shown in FIG. 7. A roller 160 which rolls on the inner surface of the lid 108 is fitted to an end portion of the support 150 on the lid 108 side. The inner surface of the lid 108 is fitted with stoppers 162 to hold the support 150 horizontally and magnets 164 to hold the support 150 in the condition that it is pressed against the inner surface of lid 108 (shown by phantom lines in FIG. 7). Further, metal filmweights 166 are fitted to both corners of the edge of the support 150 on the opposite side to the lid 108.

In the above-described structure, for ordinary projection, the convergent lens unit 126 is made to hang in the position shown by phantom lines in FIG. 7, and the support 150 is placed in the position also shown by phantom lines in FIG. 7. The film to be projected is mounted on the Fresnel reflecting mirror 102 and light is emitted from the light source lamp 120 to form an image of the film to be projected on a screen (not shown in the drawings). At that time, a space between the support 150 and the lid 108 may be used as a place to store documents.

For magnifying projection, the convergent lens unit 126 is set at a position at which the convergent lens 151 becomes coaxial with the projecting lens 152 as shown by solid lines in FIGS. 6 and 7. The support 150 is positioned horizontally and held by the stoppers 162. The film to be projected is placed on the support 150 and the light source lamp 120 is lit. The luminous light from the light source lamp 120 passes through the film to be projected on the support 150 is, reflected by the Fresnel reflecting mirror 102, passes through the film to be projected again, and is projected through the convergent lens 151, the projecting mirror 124 and the lens unit 126 on the screen. The image formed on the screen at that time is an image of the film to be projected through which the luminous light passes while advancing from the Fresnel reflecting mirror to the projecting lens. An image of the film to be projected which the luminous light passes through while advancing from the light source to the Fresnel reflecting mirror does not focus on the screen. Therefore, it is completely free from the problem of superimposed images. In the reflectory type overhead projector, this is accomplished only by intentionally separating the film to be projected from the Fresnel reflecting mirror 102 by providing the support 150.

In the above-described second embodiment, magnifying projection, is possible with only one higher power. However, a continuously variable power overhead projector can be realized by arranging the support 150 movably in the direction of the optical axis of the projecting lens 152, namely, perpendicularly, and structuring the object lens 152 and the convergent lens 151 to be movable on their optical axes.

It is convenient for feeding films to be projected continuously that a thin hole is provided near the stoppers 162 of the lid 108 of the above embodiment for use as a slit to insert films to be projected.

As a variation of the second embodiment of the present invention, an overhead projector capable of adjusting the projecting direction can be constructed by arranging the projecting mirror 124 to incline at an angle of $1/2d^o$ in the same direction when the optical axis of the projecting lens unit 128 is inclined at an angle of $d^o$.

Figure 8:
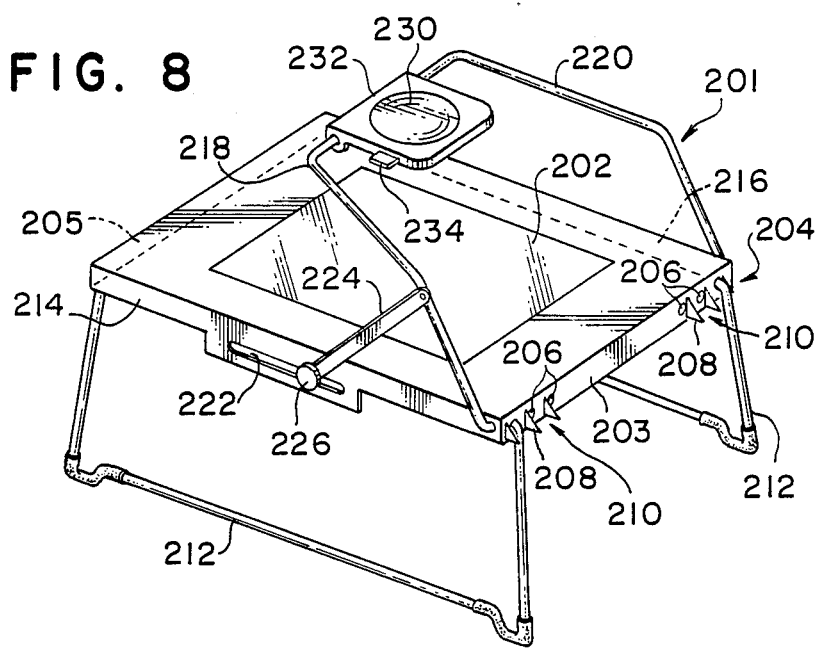
FIG. 8 is a perspective illustration of a variable power projection device of the third embodiment according to the present invention.
Figure 9:
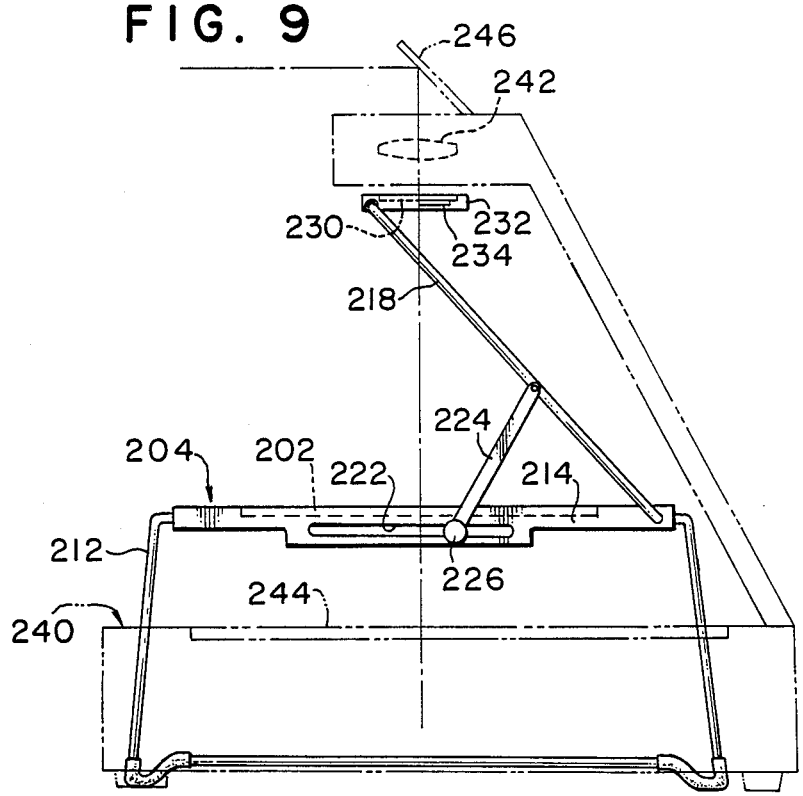
FIG. 9 is a side view of the variable power projection device shown in FIG. 8.

A variable power projecting device for an overhead projector is shown in FIGS. 8 and 9 as the third embodiment according to the present invention. As shown in FIG. 8, a variable power projecting device 201 includes a stage base 204 having a transparent plate 202, for placing the film. Outer surfaces 203, 205 of two sides of the stage base 204 facing each other are provided with pairs of leg receiving portions 210 each of which comprises a round hole 206 and a stopper protrusion 208. Substantially U-shaped legs 212 are fitted into the leg-receiving portions 210, and the leg-receiving portions are structured so that each pair of them holds the leg 212 at a different angle of inclination. Therefore, the height of the stage base 204 can be adjusted by selecting the leg-receiving portions 210.

Support members 218, 220 are respectively supported pivotally by outer side surfaces 214, 216 of the other two sides of the stage base 204 facing each other. The outer side surface 214 is provided with a long groove 222. An adjustment arm member 224 pivotally supported by a mid-portion of the support member 218 is engaged within the long groove 222 pivotally and slidably, and an end of the adjustment arm member 224 can be fixed to a desired position in the long groove 222 by fastening a fastening knob 226.

Upper ends of the support members 218, 220 support pivotally a lens frame 232 supporting a convergent lens 230. The pivotally supporting portions are in frictional engagement so as to keep the lens frame 232 directed in a desired orientation by means of a fingering protrusion 234.

Now, how to use the variable power projecting device structured as described above will be explained. To begin with, the stage base 204 is set at a predetermined height by engaging the legs 212 with selected leg-receiving portions 210, and is placed at such a position that an overhead projector 240 is covered by it as shown in FIG. 9. The fastening knob 226 is loosened and the end of the adjustment arm member 224 is slid in the long groove 222 to set the lens frame 232 at a predetermined height from the stage base 204 by changing the angle of inclination of the support members 218, 220.

Then, the lens frame 232 is positioned to be substantially horizontal through the fingering protrusion 234, and the variable power projecting device 201 is moved with respect to the overhead projector 240 to bring a projecting lens 242 of the overhead projector optically co-axial with the convergent lens 230.

With the adjustment as mentioned above, a luminous beam reflected or transmitted by a stage base 244 of the overhead projector 240 lights transmissively a subject, namely, the film to be projected (not shown in the drawings) mounted on the surface of the transparent plate 202. The projected luminous flux transmitted through the subject, after passing through the convergent lens 230 and the projecting lens 242, is reflected by a reflecting mirror 246 and is projected onto a screen (not shown in the drawings) to form an image of the subject.

The invention has thus been shown and described with reference to specific embodiments, however, it should be noted that the invention is in no way limited to the detail of the illustrated arrangements but changes and modification may be made without departing from the scope of the appended claims.

We claim:

1. An overhead film projector comprising, in combination:
    a projecting unit including a light source and a projecting lens;
    a primary film support having a projecting lens side facing said projecting lens and located in spaced relationship with the projecting unit in position to receive light from said source, said projecting unit forming a projecting luminous beam by lighting the primary film support from the projecting lens side;
    an auxiliary film support including a transparent portion;
    means for removably positioning the auxiliary film support between the projecting unit and the primary film support;
    an auxiliary lens for directing light to the projecting lens from the auxiliary film support;
    means for supporting the auxiliary lens for movement between an operative position in juxtaposition with the projecting lens and an inoperative position remote from said projecting lens; and
    a housing for said projecting unit and said primary film support, said housing being collapsible into a compact structure while maintaining the projecting unit and the primary film support therein; and
    prop means connected to the projection unit for supporting the projection unit;
    said housing including a base pivotally connected to the prop means and a lid divided into a pair of half-lid members, each of the half lid members being pivotally connected to the base; and
    said means for removably positioning the auxiliary film support including means for hanging said auxiliary support on one of the half-lid members.

2. An optical projector according to claim 1 in which the auxiliary film support has a rectangular support surface.

3. An optical projector according to claim 1 in which the auxiliary film support is provided with filmweights thereon.

4. An overhead projector according to claim 1, which further comprises magnet means mounted on the projecting unit for releasably maintaining said auxiliary lens in optical alignment with said projecting lens.

5. An overhead film projector according to claim 1, in which the primary film support comprises a reflecting mirror; the light source, the projecting lens and the reflecting mirror all being arranged along an optical projection path.

* * * * *